(12) United States Patent
Hayes et al.

(10) Patent No.: US 11,301,916 B1
(45) Date of Patent: Apr. 12, 2022

(54) PROMOTION PROCESSING SYSTEM INCLUDING CHATBOT PRODUCT RECOMMENDATION AND RELATED METHODS

(71) Applicant: Inmar Clearing, Inc., Winston-Salem, NC (US)

(72) Inventors: Jeffery Hayes, Seattle, WA (US); Gregory Clem, Seattle, WA (US); Nathanael Georgeson, Seattle, WA (US); Tyler Lenderman, Seattle, WA (US); Lee Lovett, Springfield, PA (US); Samuel May, Kent, WA (US); O'Ryan McEntire, Seattle, WA (US); Zackary Wolfe, Seattle, WA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 198 days.

(21) Appl. No.: 16/655,000

(22) Filed: Oct. 16, 2019

(51) Int. Cl.
*G06Q 30/06* (2012.01)
*H04L 12/58* (2006.01)
*H04L 51/52* (2022.01)
*H04L 51/02* (2022.01)

(52) U.S. Cl.
CPC ......... *G06Q 30/0631* (2013.01); *H04L 51/02* (2013.01); *H04L 51/32* (2013.01)

(58) Field of Classification Search
CPC ...... G06Q 30/0631; H04L 51/02; H04L 51/32
See application file for complete search history.

(56) References Cited

U.S. PATENT DOCUMENTS

| | | | |
|---|---|---|---|
| 10,032,183 B2 | 7/2018 | Wiegand | |
| 10,140,620 B2 | 11/2018 | Heath | |
| 2002/0090985 A1* | 7/2002 | Tochner | A63F 13/655 463/1 |
| 2009/0076912 A1 | 3/2009 | Rajan et al. | |
| 2011/0153403 A1 | 6/2011 | Postrel | |
| 2014/0006163 A1 | 1/2014 | Sengupta et al. | |
| 2014/0278878 A1* | 9/2014 | Wiegand | G06Q 30/0233 705/14.25 |
| 2014/0278951 A1 | 9/2014 | O'Connor et al. | |
| 2015/0046240 A1* | 2/2015 | Moreton | G06Q 30/0225 705/14.17 |
| 2017/0189816 A1* | 7/2017 | Van Briggle | A63F 13/61 |
| 2017/0345014 A1* | 11/2017 | Kochura | G06Q 30/016 |
| 2018/0103004 A1* | 4/2018 | Demir | H04L 51/32 |

(Continued)

FOREIGN PATENT DOCUMENTS

WO 2018034494 A1 2/2018
WO 2018214163 A1 11/2018

*Primary Examiner* — Richard G Keehn
*Assistant Examiner* — Hassan A Khan
(74) *Attorney, Agent, or Firm* — Allen, Dyer, Doppelt + Gilchrist, P.A.

(57) ABSTRACT

A promotion processing system may include a remote device and a promotion server. The promotion server may be configured to generate a promotion within a social media feed. The promotion may be associated with a given product brand. The promotion server may be configured to operate a chatbot conversation on the remote device corresponding to the promotion. The chatbot may be operated to determine a recommended product within the given product brand, validate a purchase of the recommended product, and permit redemption of the promotion based upon validation of the purchase.

24 Claims, 6 Drawing Sheets

(56) References Cited

U.S. PATENT DOCUMENTS

2018/0191643 A1\* 7/2018 Berry ................... H04L 51/046
2019/0034949 A1\* 1/2019 Wellisch ............ G06Q 30/0235
2019/0043106 A1\* 2/2019 Talmor .................. G06N 3/006

\* cited by examiner

PROMOTION PROCESSING SYSTEM INCLUDING CHATBOT PRODUCT RECOMMENDATION AND RELATED METHODS

TECHNICAL FIELD

The present invention relates to the field of electronics, and more particularly, to chatbot based communications and related methods.

BACKGROUND

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

An electronic messenger program or chatbot is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A chatbot may be particularly useful for customer service or information acquisition applications.

SUMMARY

A promotion processing system may include a remote device and a promotion server. The promotion server may be configured to generate a promotion within a social media feed. The promotion may be associated with a given product brand. The promotion server may be configured to operate a chatbot conversation on the remote device corresponding to the promotion. The chatbot may be operated to determine a recommended product within the given product brand, validate a purchase of the recommended product, and permit redemption of the promotion based upon validation of the purchase.

The promotion server may be configured to generate redeemable points usable toward redemption of the promotion based upon validating the purchase of the recommended product. The redeemable points may be redeemable toward a promotion for another product within the brand, for example.

The remote device may include a mobile wireless communications device. The mobile wireless communications device may include a camera and a mobile controller coupled thereto and configured to obtain receipt image data corresponding to the purchase of the recommended product to validate the purchase of the recommended product, for example.

The promotion server may be configured to generate and communicate a follow-up reminder notification to the remote device to repurchase the recommended product, for example. The promotion server may be configured to determine a consumption time period for the recommended product and generate and communicate the follow-up reminder notification based upon the consumption time period.

The promotion server may be configured to generate a repurchase promotion for the recommended product and communicate the repurchase promotion to the remote device. The promotion server may be configured to cooperate with the remote device to prompt a given user with a plurality of recommended responses to questions presented within the chatbot conversation and obtain a selected response from the plurality of recommended responses, for example.

A method aspect is directed to a method of processing a promotion. The method may include using a promotion server to generate the promotion within a social media feed. The promotion may be associated with a given product brand. The method may include using the promotion server to operate a chatbot conversation on a remote device corresponding to the promotion. The chatbot conversation may be operated to determine a recommended product within the given product brand, validate a purchase of the recommended product, and permit redemption of the promotion based upon validation of the purchase.

A computer readable medium aspect is directed to a non-transitory computer readable medium for processing a promotion. The non-transitory computer readable medium includes computer executable instructions that when executed by a processor cause the processor to perform operations. The operations may include generating the promotion within a social media feed. The promotion may be associated with a given product brand. The operations may also include operating a chatbot conversation on a remote device corresponding to the promotion to determine a recommended product within the given product brand, validate a purchase of the recommended product, and permit redemption of the promotion based upon validation of the purchase.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-5, a system 20 for processing a promotion includes a remote device that is illustratively in the form of mobile wireless communications device 30. The mobile wireless communications device 30 illustratively includes a portable housing 31, a mobile controller 32 and wireless communications circuitry 34 coupled to the mobile device controller. The mobile wireless communications device 30 also includes a display 35, such as, for example, a touch display, carried by the portable housing 31 and coupled to the mobile device controller 32. The mobile wireless communications device 30 may include one or more input devices, for example, a camera 37 and other types of input or output devices. The mobile wireless communications device 30 may be a mobile phone or smartphone, a tablet computer, or other type of mobile wireless communications device, as will be appreciated by those skilled in the art.

Figure 5:
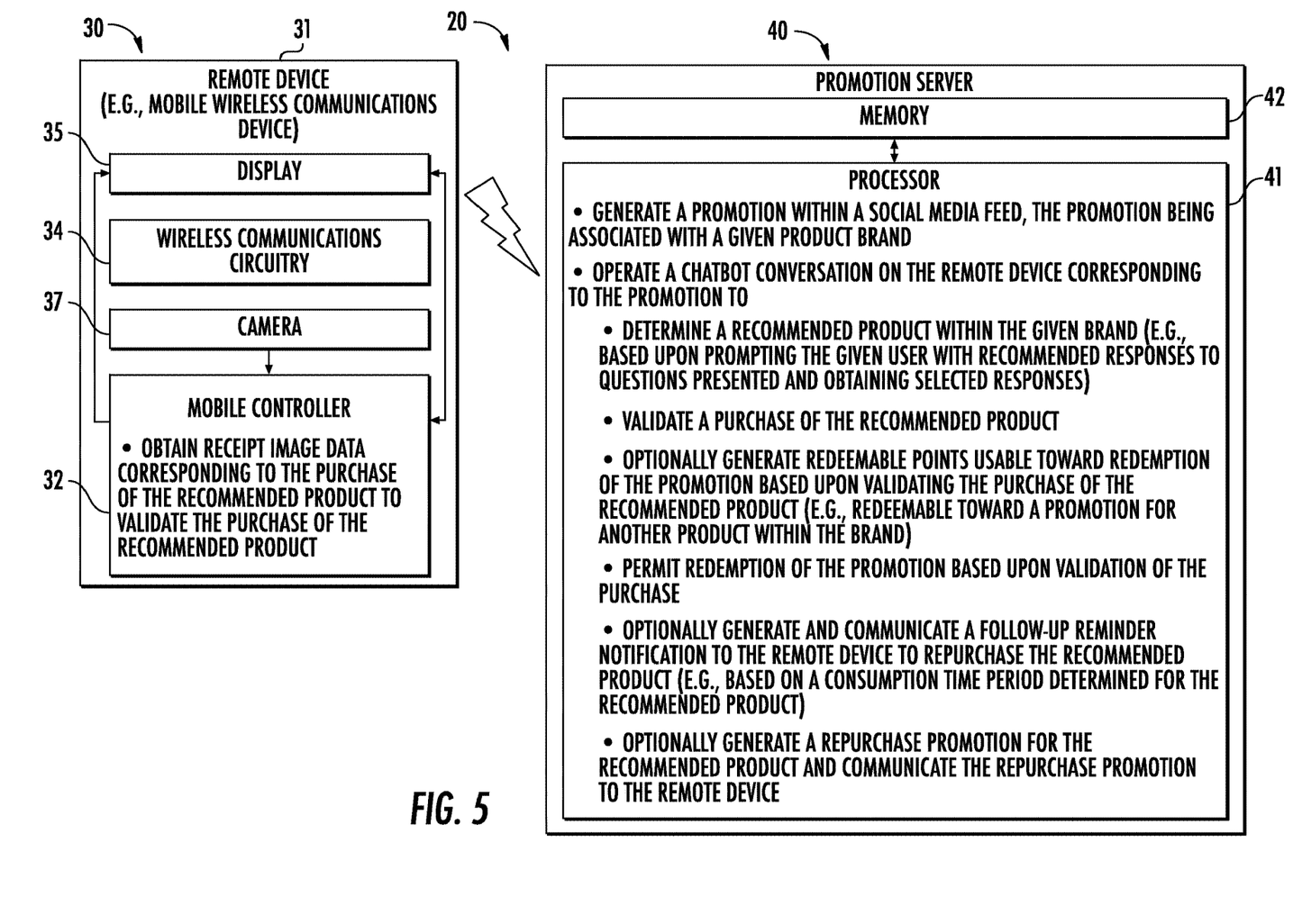
FIG. 5 is a schematic block diagram of a promotion processing system in accordance with an embodiment.

The promotions processing system 20 also includes a promotion server 40 communicatively coupled to the mobile wireless communications device 30. The promotion server 40 includes a processor 41 and a memory 42 associated with the processor.

Figure 6:
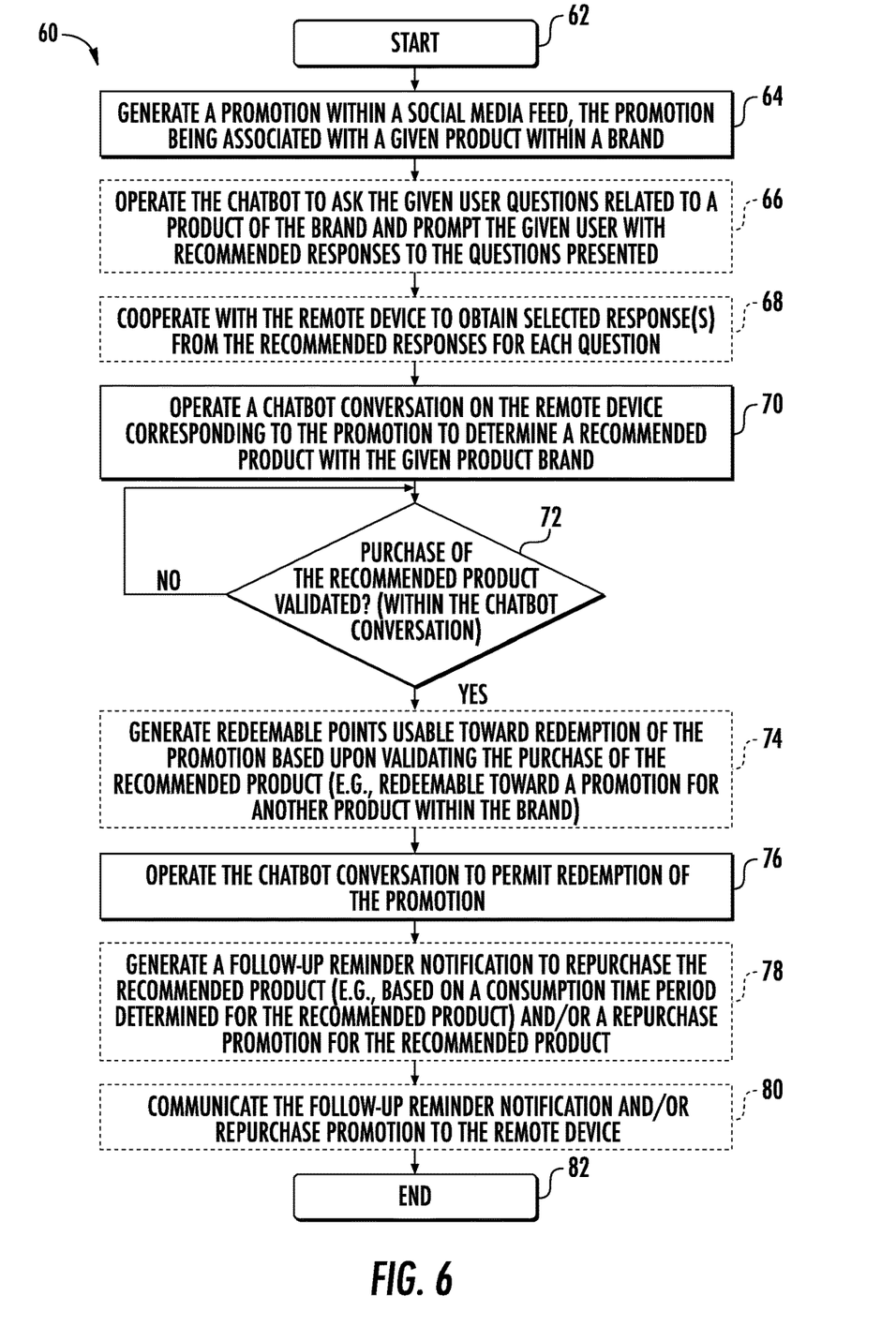
FIG. 6 is a flow diagram of operation of a promotion server of the promotion processing system of FIG. 5.

Referring now additionally to the flowchart 60 in FIG. 6, beginning at Block 62, operations of the promotion processing system 20 with respect to the promotion server 40 will now be described. At Block 64, the promotion server 40 operates a promotion 21 within a social media feed 25.

The promotion 21 is associated with a brand (e.g., Brand R in the example implementation). For example, the promotion 21 may be for a coupon (e.g., digital coupon), rebate, or other promotion toward the purchase of a product within the brand.

The promotion server 40 operates a chatbot conversation 24 on the mobile wireless communications device 30. More particularly, the promotion server 40 may cooperate with the mobile wireless communications device 30 so that the chatbot conversation 24 is displayed on the display 35.

The chatbot 22 may be implemented in the form of a two-way dialog box that permits the given user to communicate by way of typing (i.e., written communication). In some embodiments, the chatbot 22 may operate through voice commands or spoken words. For example, the chatbot 22 may be activated upon selection of, or liking, the promotion 21 from within the social media feed 25. The chatbot conversation 24 may be inline in the social media feed 25 or may be executed through a messenger program or application associated with the social media feed. The application or program associated with the chatbot 22 may be executed or opened, for example, based upon user selection of the promotion 21.

Figure 1:
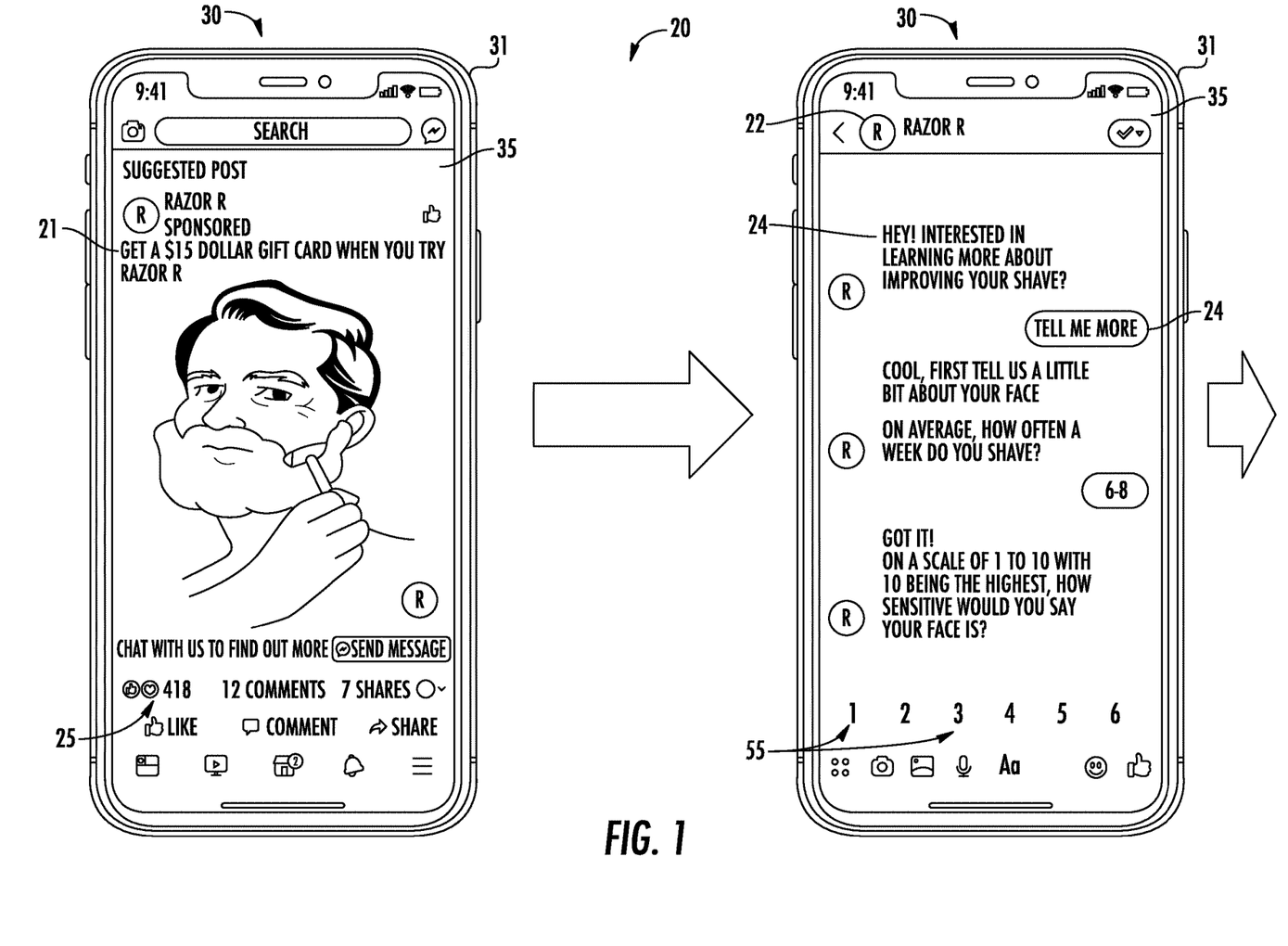
FIG. 1 is a schematic diagram of a promotion processing system in accordance with an embodiment.

In particular, at Block 66, the promotion server 40 cooperates with mobile wireless communications device 30 and operates the chatbot 22 to ask the given user questions related to a product of the brand and prompt the given user with recommended responses 55 to the questions presented. For example, in the exemplary implementation, the chatbot 22 asks questions related to shaving, for example, how often the given user shaves and how sensitive is the given user's skin (FIG. 1). At Block 68, the promotion server 40 cooperates with the mobile wireless communications device 30 to obtain a selected response 53 or responses to the questions presented from the recommended responses 55 and within the chatbot 22.

Figure 2:
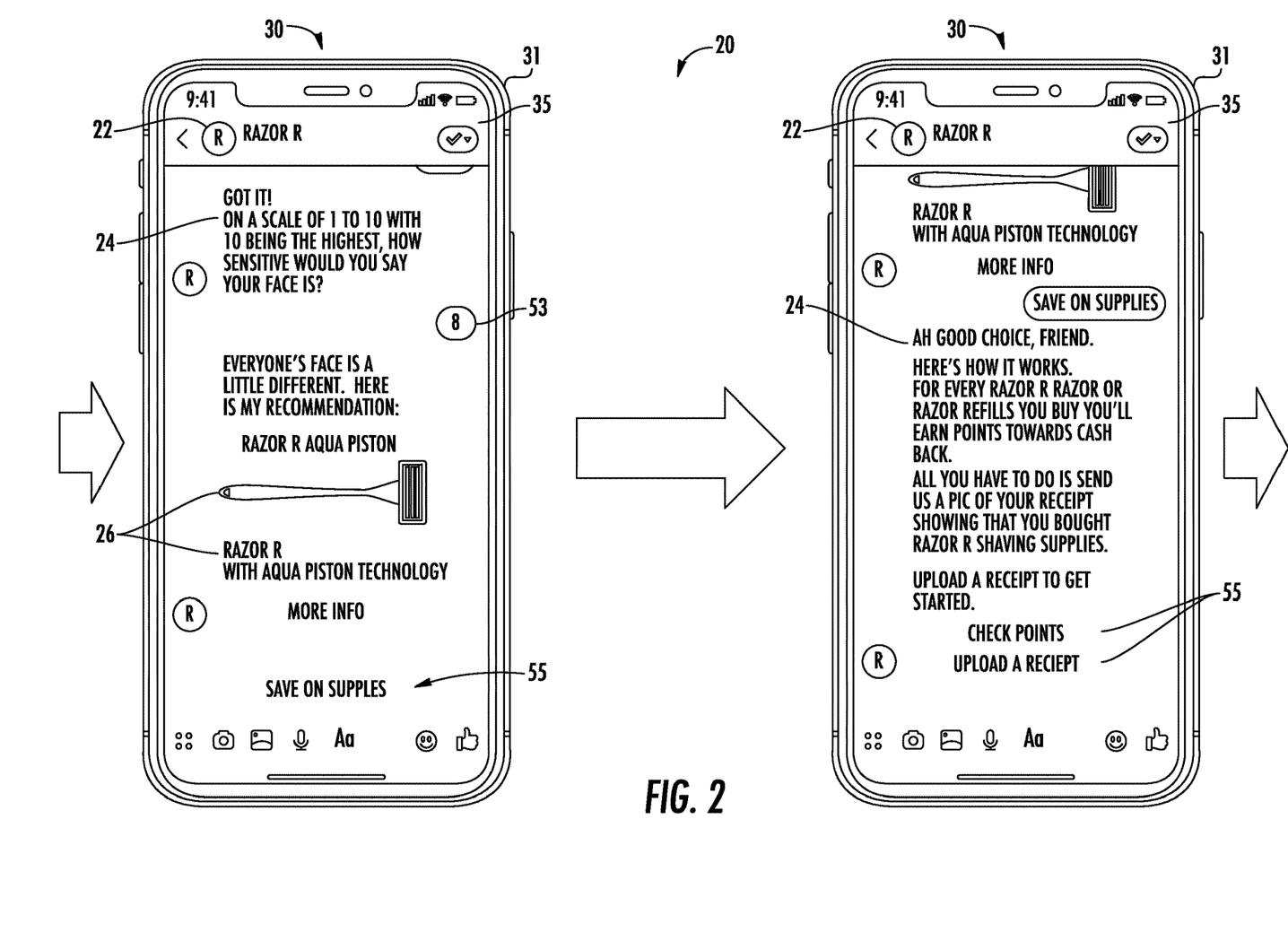
FIG. 2 is another schematic diagram of the promotion processing system in accordance with an embodiment.

At Block 70, the promotion server 40 operates the chatbot 22 to determine a recommended product 26 within the given product brand (FIG. 2). The promotion server 40 may determine the recommended product 26 based upon the responses 53 to the chatbot questions. For example, with respect the shaving implementation described herein, the type of razor recommended may be based upon frequency of usage (e.g., daily, weekly, etc.), skin sensitivity, and/or hair type (e.g., thin, bushy) (FIG. 1). Of course, other and/or additional factors may be used to determine the recommended product 26. In some embodiments where the recommended product 26 is food item of a food brand, the promotion server 40 may base the determination on a prior purchase history of food items, for example, available from a store's loyalty program.

After determining the recommended product 26 within the given product brand (Block 70), the promotion server 40 may continue the chatbot conversation 24 by prompting the given user if they are interested in "saving" on the recommended product (FIG. 2). Instructions on how to participate in the promotion 21 may thus be communicated via the chatbot conversation 24 (FIG. 2).

Figure 3:
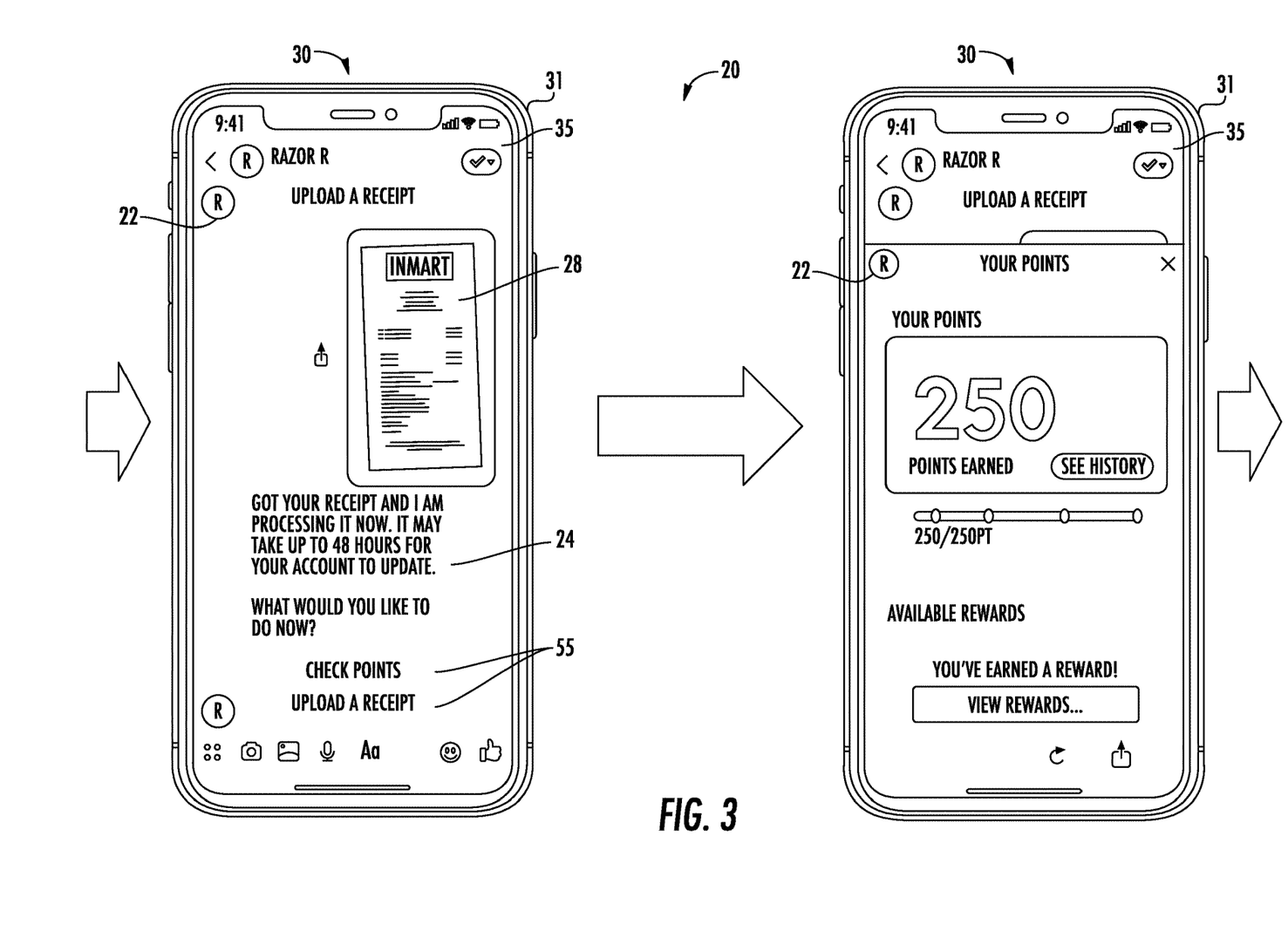
FIG. 3 is another schematic diagram of the promotion processing system in accordance with an embodiment.

The given user may purchase the recommended product 26 and be desirous of redeeming the promotion 21. At Block 72, the promotion server 40 validates a purchase of the recommended product 26. For example, the given user may use the mobile wireless communications device 30, and more particularly, the camera 37, to obtain receipt image data (e.g., in the form of a photo of the receipt 28) corresponding to the recommended product 26 (FIG. 3). The promotion server 40 may use image recognition to validate the receipt 28, for example, determining whether the recommended product 26 is on the receipt. The promotion server 40 may alternatively or additionally validate the purchase based upon a comparison to a transaction log for the retailer listed on the receipt 28. If, at Block 72, the purchase cannot be validated, the promotion server 40 awaits a further validation.

If at Block 72, the purchase is validated, the promotion server 40 may generate, within the chatbot 22, redeemable points that are usable toward redemption of the promotion 21 and to be used toward the recommended product purchased (Block 74) (FIG. 3). In some embodiments, the redeemable points may be usable toward a promotion of another product within the brand and/or another product for a different brand, for example.

Figure 4:
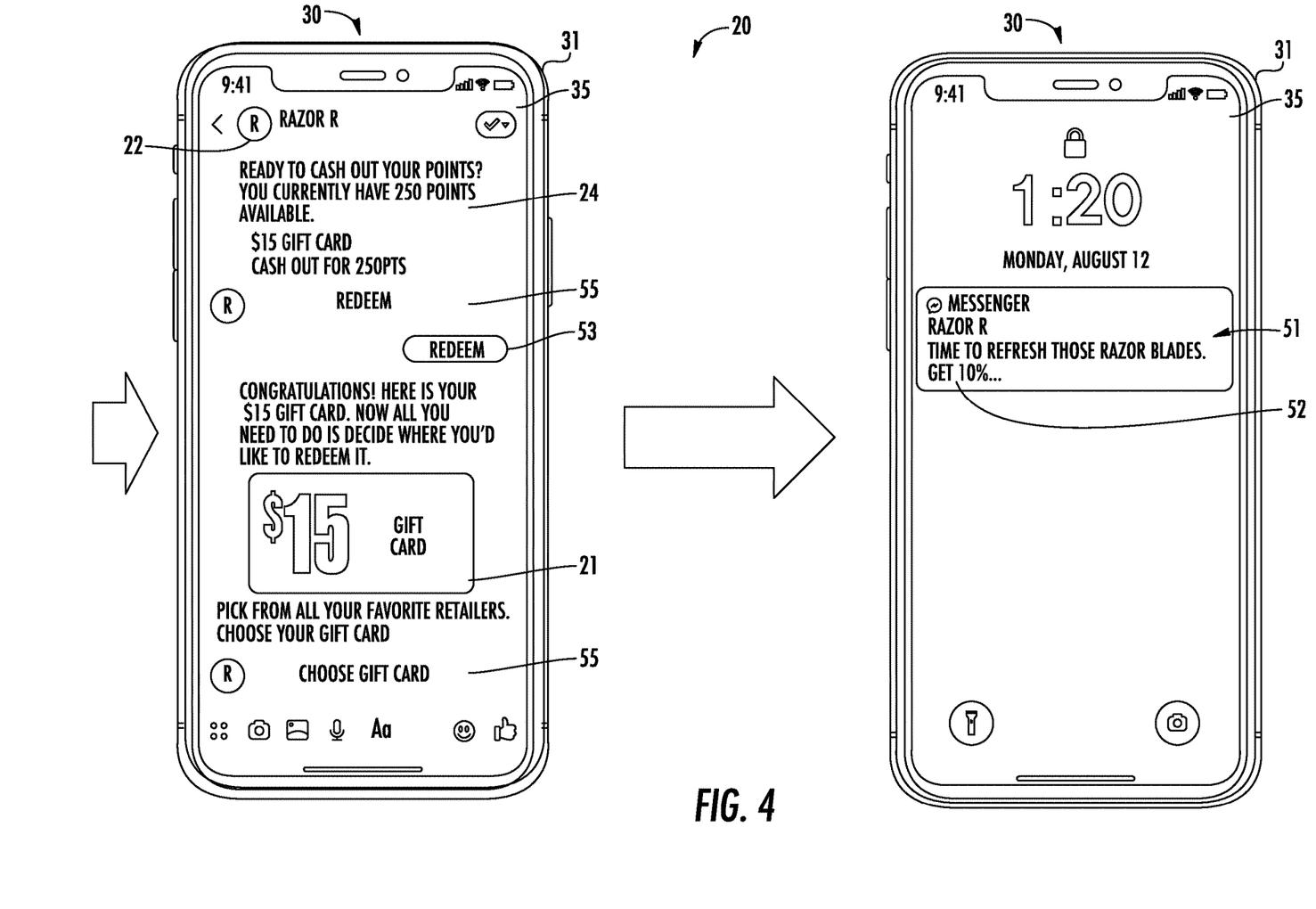
FIG. 4 is another schematic diagram of the promotion processing system in accordance with an embodiment.

At Block 76, the promotion server 40 operates the chatbot 22 to permit redemption of the promotion 21 based upon the validation. More particularly, where redeemable points are generated, the redeemable points may be redeemed for the promotion 21 (e.g., $15 Gift Card) or accumulated (FIG. 4). The amount of redeemable points a given user has accumulated may be checked by the given user, for example, within the chatbot 22.

In some embodiments, for example, where redeemable points are not generated, redemption of the promotion 21 may be based upon the validation. In other words, once the purchase of the recommended product 26 has been validated, the given user may redeem the promotion 21 without the use of redeemable points. Of course, the given user may choose not to redeem any redeemable points for the promotion 21, but instead, may bank or save the redeemable point for a future promotion or redemption. The promotion 21, upon redemption, may be loaded to a loyalty card of a retailer that is associated with the given user.

At Block 78, the promotion server 40 may generate a follow-up reminder notification 51 to repurchase the product (FIG. 4). More particularly, the promotion server 40 may determine a consumption time period for the recommended product 26. The consumption time period may be based upon responses to questions presented to and answered by the given user within the chatbot 22. The promotion server 40 may alternatively or additionally generate a repurchase promotion 52 for the recommended product 26 (Block 78) (FIG. 4). The repurchase promotion 52 may be generated along with the follow-up reminder notification 51. In some embodiments, the repurchase promotion 52 may be generated without generating the follow-up reminder notification 51 and vice versa. At Block 80, the promotion server 40 communicates the follow-up reminder notification 51 and the repurchase promotion 52 to the mobile wireless communications device 30 for display thereon, and more particularly, for display within the chatbot conversation 24. In some embodiments, the promotion server 40 may not generate and communicate any notifications or repurchase promotions. Operations end at Block 82.

A method aspect is directed to a method of processing a promotion 21. The method may include using a promotion server 40 to generate the promotion 21 within a social media feed 25. The promotion 21 may be associated with a given product brand. The method may include using the promotion server 40 to operate a chatbot conversation 24 on a remote device 30 corresponding to the promotion 21. The chatbot conversation 24 may be operated to determine a recommended product 26 within the given product brand, validate a purchase of the recommended product, and permit redemption of the promotion 21 based upon validation of the purchase.

A computer readable medium aspect is directed to a non-transitory computer readable medium for processing a promotion 21. The non-transitory computer readable medium includes computer executable instructions that when executed by a processor 41 cause the processor to perform operations. The operations may include generating the promotion 21 within a social media feed 25. The promotion 21 may be associated with a given product brand. The operations may also include operating a chatbot conversation 24 on a remote device 30 corresponding to the promotion 21 to determine a recommended product 26 within the given product brand, validate a purchase of the recommended product, and permit redemption of the promotion based upon validation of the purchase.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system comprising:
a remote device; and
a promotion server configured to
generate a promotion within a social media feed, the promotion being associated with a given product brand, and
operate a chatbot conversation on the remote device corresponding to the promotion to
determine a recommended product within the given product brand,
validate a purchase of the recommended product,
permit redemption of the promotion based upon validation of the purchase,
determine a consumption time period for the recommended product, and
generate and communicate a follow-up reminder notification to the remote device to repurchase the recommended product based upon the consumption time period.

2. The promotion processing system of claim 1 wherein the promotion server is configured to generate redeemable points usable toward redemption of the promotion based upon validating the purchase of the recommended product.

3. The promotion processing system of claim 2 wherein the redeemable points are redeemable toward a promotion for another product within the brand.

4. The promotion processing system of claim 1 wherein the remote device comprises a mobile wireless communications device.

5. The promotion processing system of claim 4 wherein the mobile wireless communications device comprises a camera and a mobile controller coupled thereto and configured to obtain receipt image data corresponding to the purchase of the recommended product to validate the purchase of the recommended product.

6. The promotion processing system of claim 1 wherein the promotion server is configured to cooperate with the remote device to prompt a given user with a plurality of recommended responses to questions presented within the chatbot conversation and obtain a selected response from the plurality of recommended responses.

7. A promotion processing server comprising:
a processor and an associated memory configured to
generate a promotion within a social media feed, the promotion being associated with a given product brand, and
operate a chatbot conversation on a remote device corresponding to the promotion to
determine a recommended product within the given product brand,
validate a purchase of the recommended product,
permit redemption of the promotion based upon validation of the purchase,
determine a consumption time period for the recommended product, and
generate and communicate a follow-up reminder notification to the remote device to repurchase the recommended product based upon the consumption time period.

8. The promotion processing server of claim 7 wherein the processor is configured to generate redeemable points usable toward redemption of the promotion based upon validating the purchase of the recommended product.

9. The promotion processing server of claim 7 wherein the processor is configured to cooperate with the remote device to prompt a given user with a plurality of recommended responses to questions presented within the chatbot conversation and obtain a selected response from the plurality of recommended responses.

10. A method of processing a promotion comprising:
using a promotion server to
generate the promotion within a social media feed, the promotion being associated with a given product brand, and
operate a chatbot conversation on a remote device corresponding to the promotion to
determine a recommended product within the given product brand,
validate a purchase of the recommended product,
permit redemption of the promotion based upon validation of the purchase,
determine a consumption time period for the recommended product, and
generate and communicate a follow-up reminder notification to the remote device to repurchase the recommended product based upon the consumption time period.

11. The method of claim 10 wherein using the promotion server comprises using the promotion server to generate redeemable points usable toward redemption of the promotion based upon validating the purchase of the recommended product.

12. The method of claim 10 wherein using the promotion server comprises using the promotion to prompt a given user with a plurality of recommended responses to questions presented within the chatbot conversation and obtain a selected response from the plurality of recommended responses.

13. A non-transitory computer readable medium for processing a promotion, the non-transitory computer readable medium comprising computer executable instructions that when executed by a processor cause the processor to perform operations comprising:
generating the promotion within a social media feed, the promotion being associated with a given product brand; and
operating a chatbot conversation on a remote device corresponding to the promotion to
determine a recommended product within the given product brand,
validate a purchase of the recommended product,
permit redemption of the promotion based upon validation of the purchase,
determine a consumption time period for the recommended product, and
generate and communicate a follow-up reminder notification to the remote device to repurchase the recommended product based upon the consumption time period.

14. The non-transitory computer readable medium of claim 13 wherein the operations comprise generating redeemable points usable toward redemption of the promotion based upon validating the purchase of the recommended product.

15. A promotion processing system comprising:
a remote device; and
a promotion server configured to
generate a promotion within a social media feed, the promotion being associated with a given product brand, and
operate a chatbot conversation on the remote device corresponding to the promotion to
determine a recommended product within the given product brand,
validate a purchase of the recommended product,
permit redemption of the promotion based upon validation of the purchase, and
generate a repurchase promotion for the recommended product and communicate the repurchase promotion to the remote device.

16. The promotion processing system of claim 15 wherein the promotion server is configured to generate redeemable points usable toward redemption of the promotion based upon validating the purchase of the recommended product.

17. The promotion processing system of claim 16 wherein the redeemable points are redeemable toward a promotion for another product within the brand.

18. The promotion processing system of claim 15 wherein the remote device comprises a mobile wireless communications device.

19. A promotion processing server comprising:
a processor and an associated memory configured to
generate a promotion within a social media feed, the promotion being associated with a given product brand, and
operate a chatbot conversation on a remote device corresponding to the promotion to
determine a recommended product within the given product brand,
validate a purchase of the recommended product,
permit redemption of the promotion based upon validation of the purchase, and
generate a repurchase promotion for the recommended product and communicate the repurchase promotion to the remote device.

20. The promotion processing server of claim 19 wherein the processor is configured to generate redeemable points usable toward redemption of the promotion based upon validating the purchase of the recommended product.

21. A method of processing a promotion comprising:
using a promotion server to
generate the promotion within a social media feed, the promotion being associated with a given product brand, and
operate a chatbot conversation on a remote device corresponding to the promotion to
determine a recommended product within the given product brand,
validate a purchase of the recommended product,
permit redemption of the promotion based upon validation of the purchase, and
generate a repurchase promotion for the recommended product and communicate the repurchase promotion to the remote device.

22. The method of claim 21 wherein using the promotion server comprises using the promotion server to generate redeemable points usable toward redemption of the promotion based upon validating the purchase of the recommended product.

23. A non-transitory computer readable medium for processing a promotion, the non-transitory computer readable medium comprising computer executable instructions that when executed by a processor cause the processor to perform operations comprising:
generating the promotion within a social media feed, the promotion being associated with a given product brand; and
operating a chatbot conversation on a remote device corresponding to the promotion to determine a recommended product within the given product brand, validate a purchase of the recommended product, permit redemption of the promotion based upon validation of the purchase, and generate a repurchase promotion for the recommended product and communicate the repurchase promotion to the remote device.

24. The non-transitory computer readable medium of claim 23 wherein the operations comprise generating redeemable points usable toward redemption of the promotion based upon validating the purchase of the recommended product.

* * * * *